(12) United States Patent
Inoko

(10) Patent No.: US 9,086,560 B2
(45) Date of Patent: Jul. 21, 2015

(54) OPTICAL SYSTEM AND IMAGE PROJECTION APPARATUS INCLUDING THE SAME

(71) Applicant: CANON KABUSHIKI KAISHA, Tokyo (JP)

(72) Inventor: Kazuhiro Inoko, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 14/148,389

(22) Filed: Jan. 6, 2014

(65) Prior Publication Data
US 2014/0192419 A1    Jul. 10, 2014

(30) Foreign Application Priority Data
Jan. 8, 2013    (JP) ................. 2013-001013

(51) Int. Cl.
   *G02B 3/00*    (2006.01)
   *G02B 9/00*    (2006.01)
   *G02B 13/04*    (2006.01)
   *G02B 27/00*    (2006.01)
   *G02B 15/177*    (2006.01)

(52) U.S. Cl.
   CPC .............. *G02B 13/04* (2013.01); *G02B 15/177* (2013.01); *G02B 27/0062* (2013.01)

(58) Field of Classification Search
   CPC ................................. G02B 13/16; G02B 13/18
   USPC ......... 359/649, 676, 680–682, 708, 717, 733, 359/754
   See application file for complete search history.

(56) References Cited

U.S. PATENT DOCUMENTS

| 5,995,295 A * | 11/1999 | Nagaoka ................. 359/654 |
| 2006/0061872 A1 | 3/2006 | Yamasaki |
| 2007/0195427 A1 | 8/2007 | Sugita |
| 2010/0053766 A1 | 3/2010 | Okada |

FOREIGN PATENT DOCUMENTS

| EP | 2196837 A1 | 6/2010 |
| JP | 2010-139766 A | 6/2010 |

OTHER PUBLICATIONS

Optical Glass Data Sheet, p. 108, (2010), <http://www.schott.com>, XP-002725337.

* cited by examiner

*Primary Examiner* — James Greece
(74) *Attorney, Agent, or Firm* — Canon U.S.A., Inc., IP Division

(57) ABSTRACT

In an optical system including a front lens unit having negative refractive power, a stop, and a rear lens unit having positive refractive power in order from an enlargement side to a reduction side, the front lens unit has a combination lens in which a negative lens and a positive lens are adjacently arranged in order from the enlargement side to the reduction side, and a focal length of the negative lens $f_N$, an Abbe number $\nu_N$ and relative partial dispersion $\theta_N$ of a material of the negative lens, an Abbe number $\nu_P$ and relative partial dispersion $\theta_P$ of a material of the positive lens, and a focal length of the entire optical system $f_W$ are appropriately set.

12 Claims, 13 Drawing Sheets

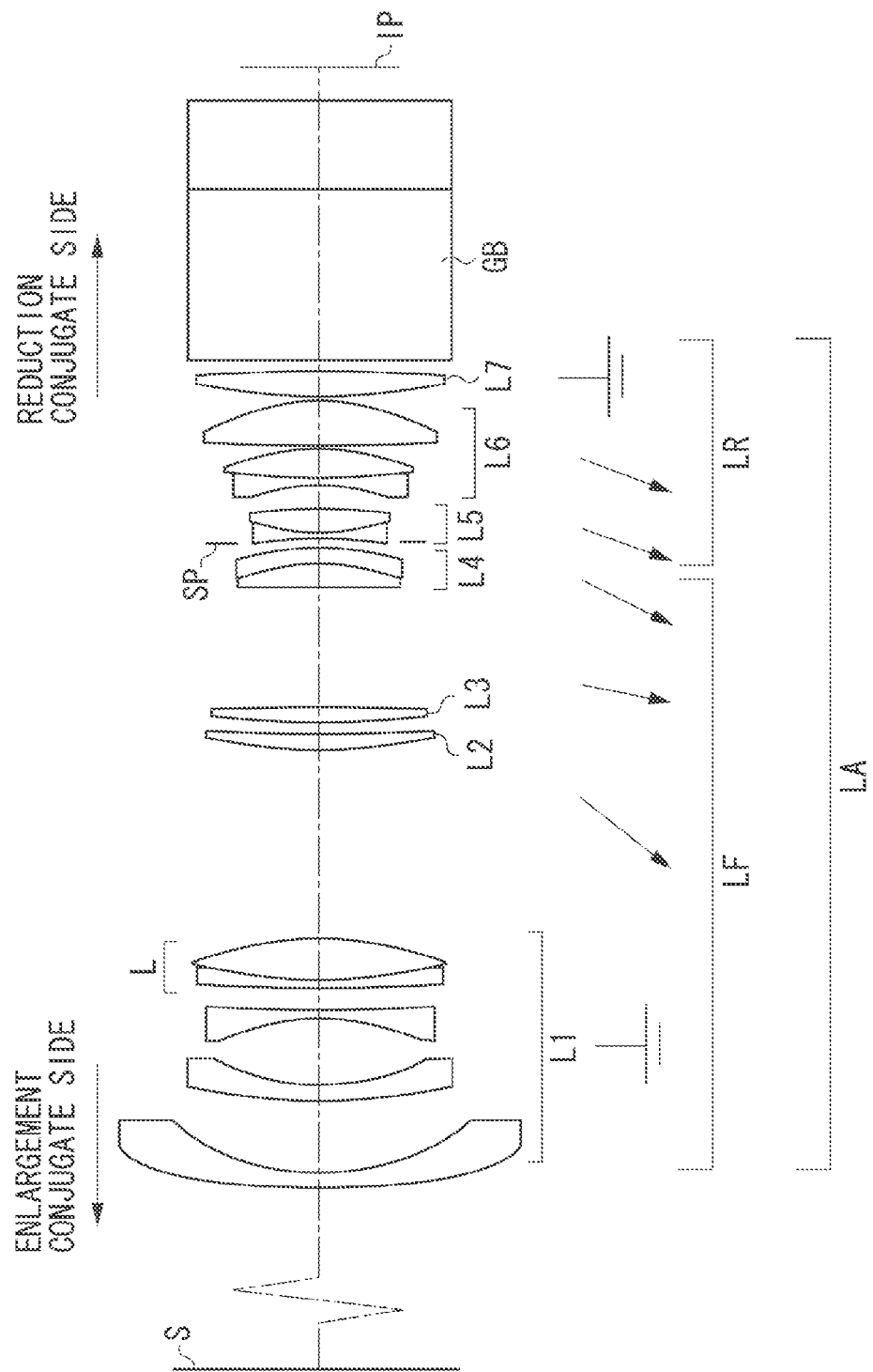

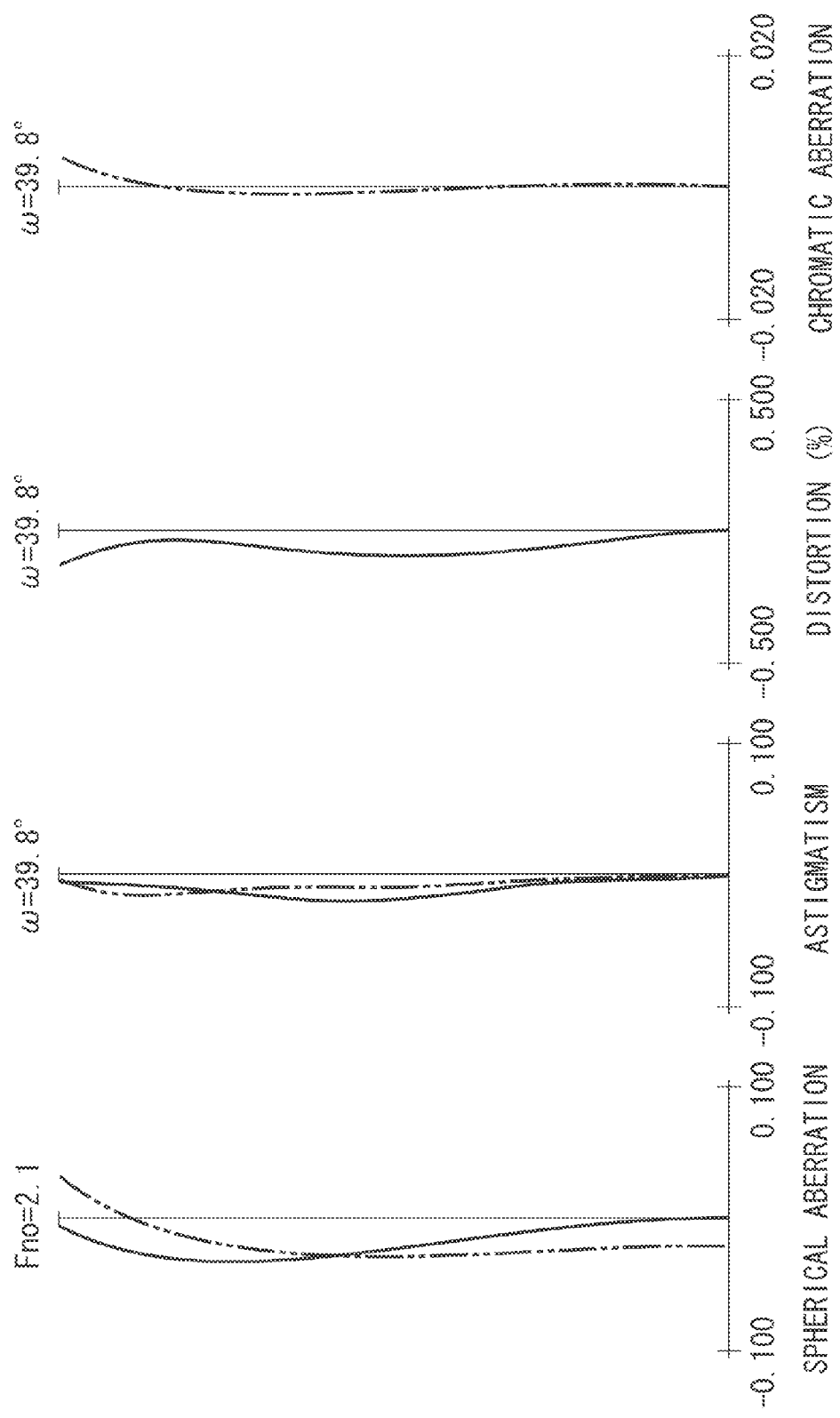

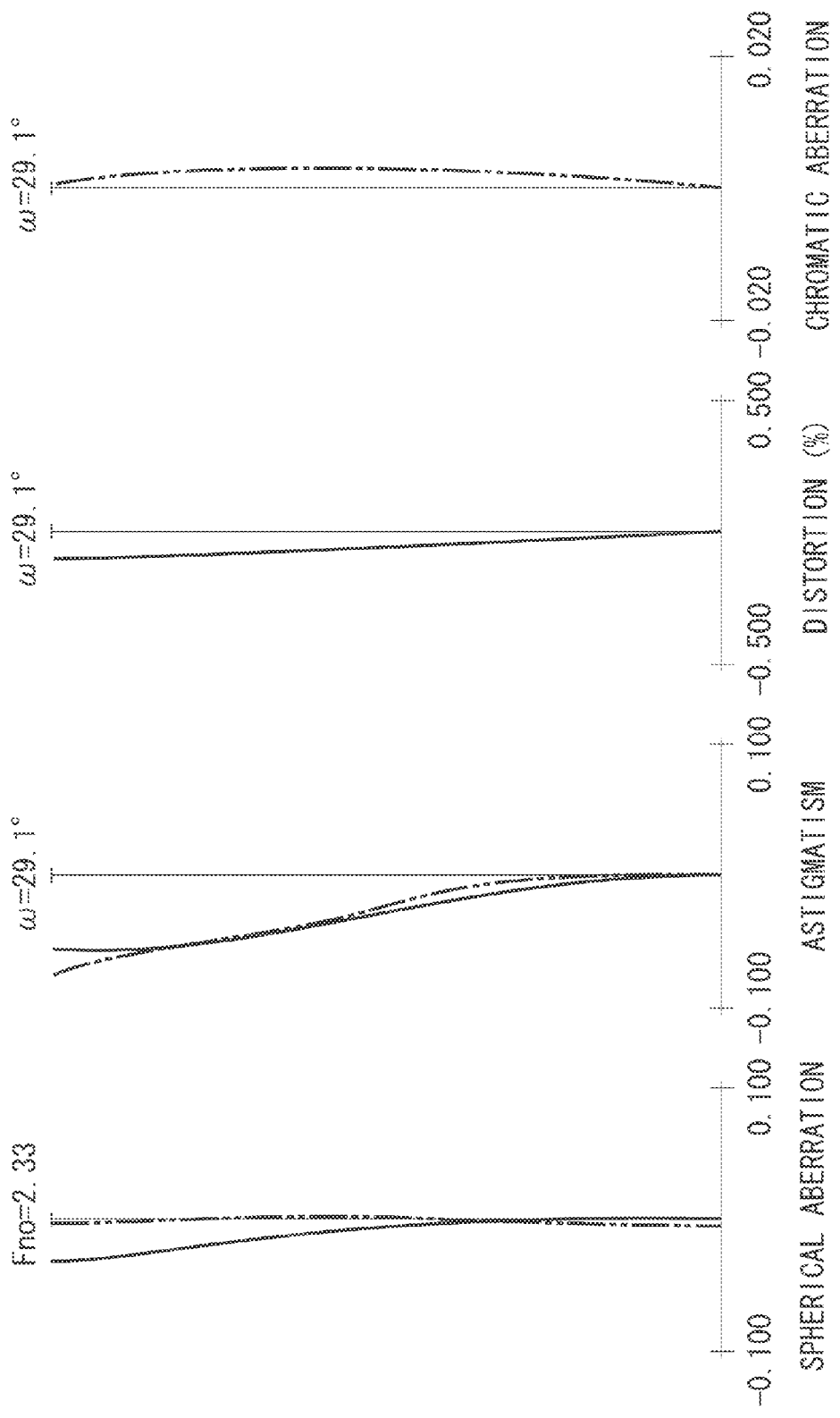

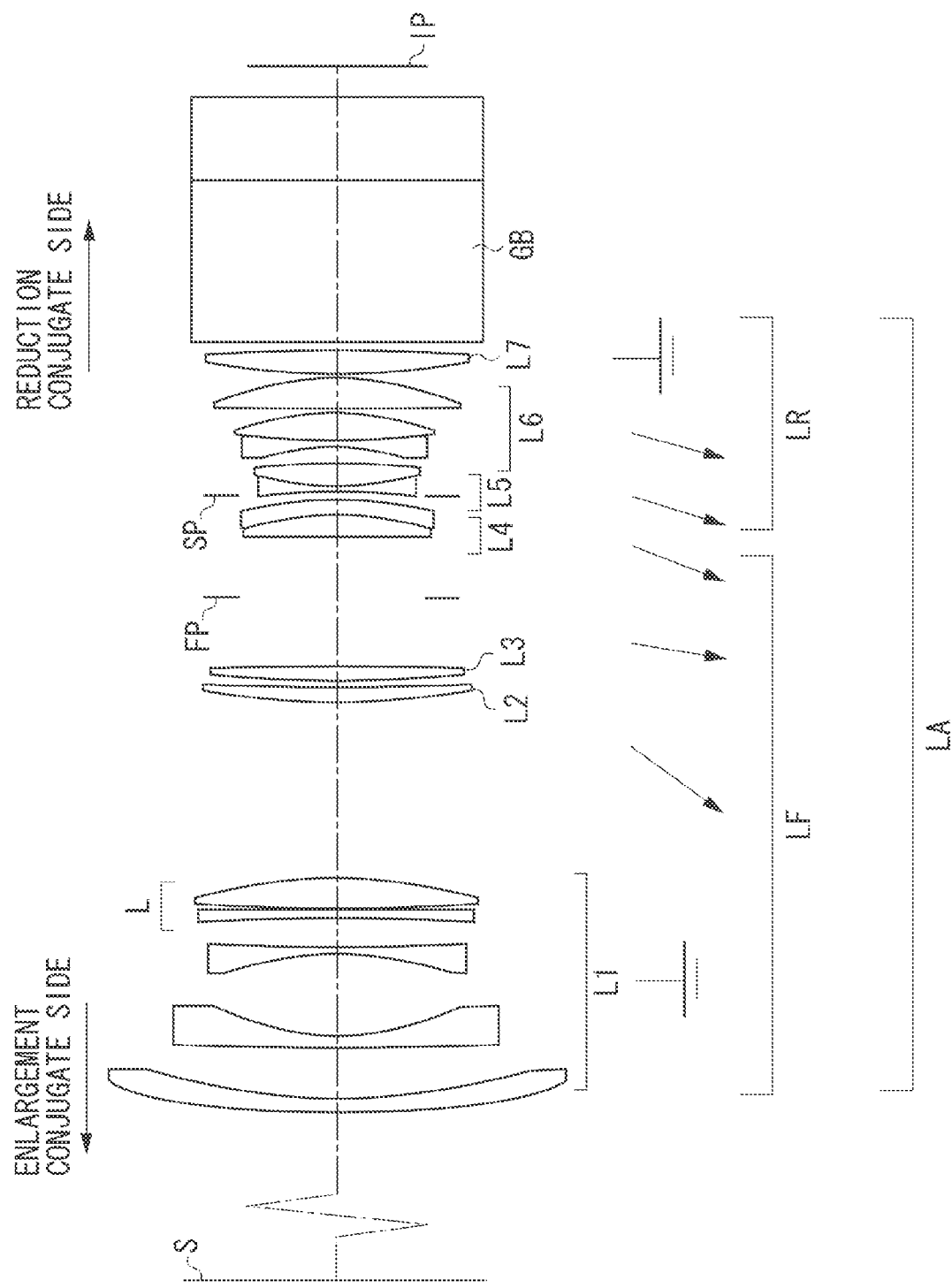

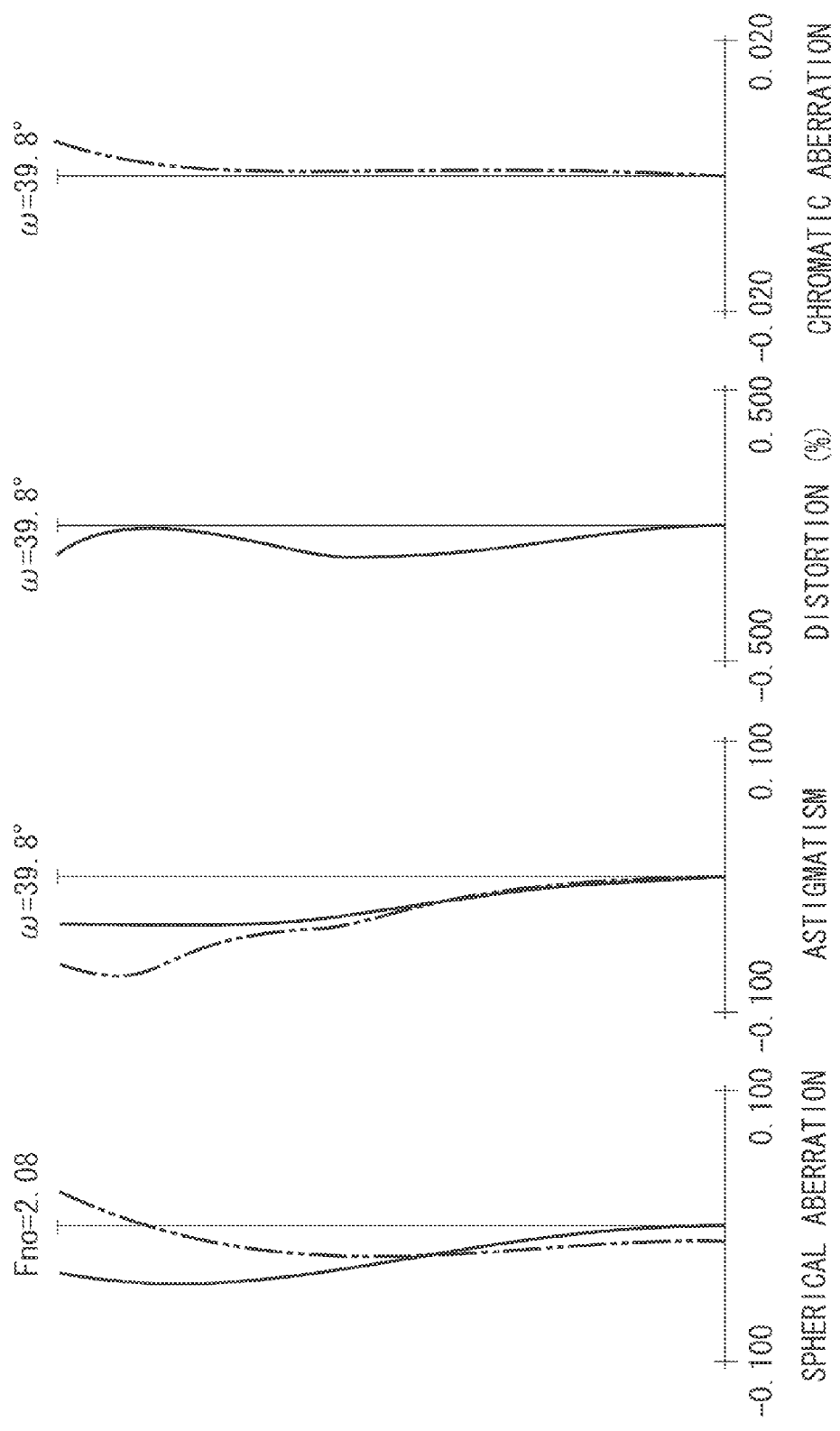

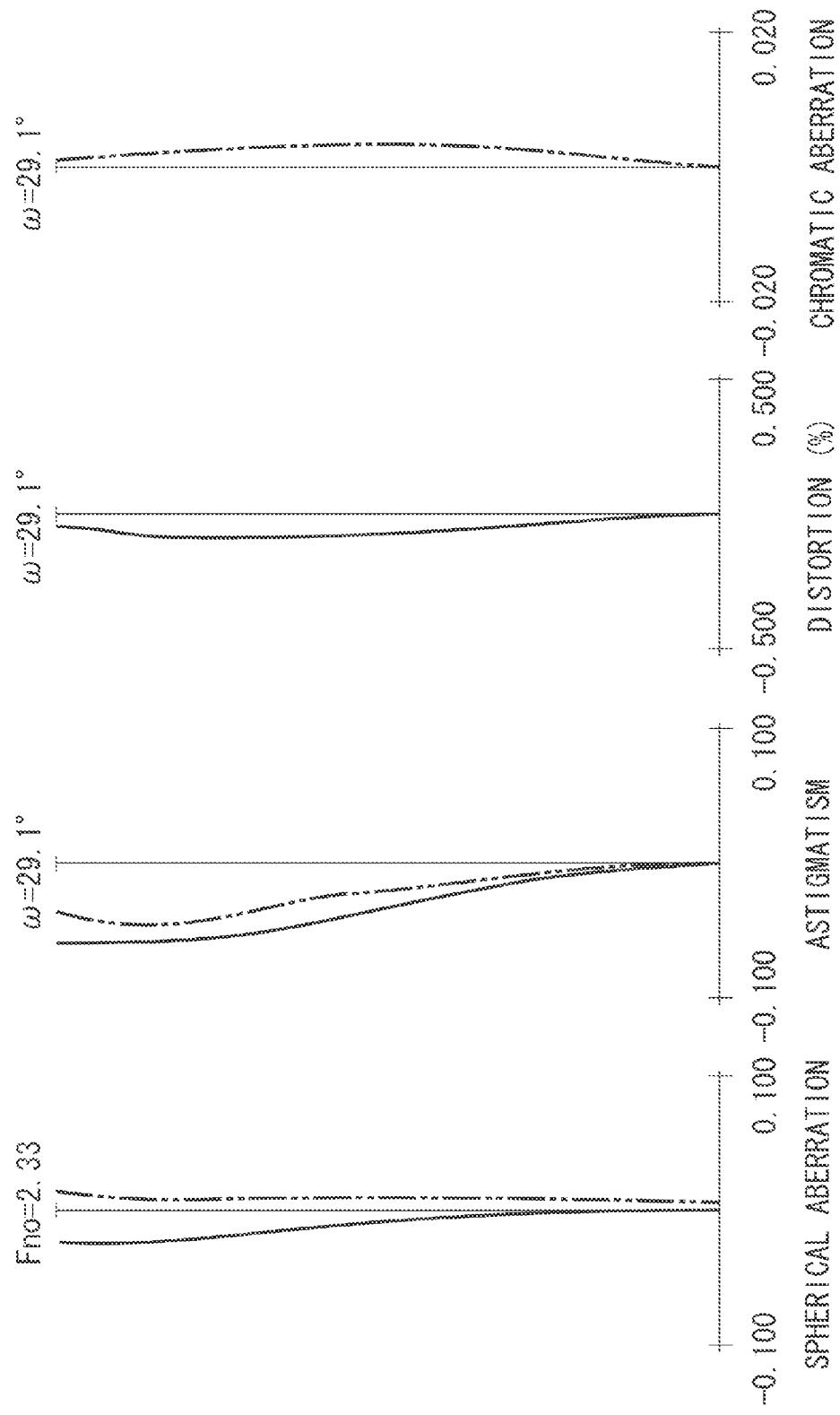

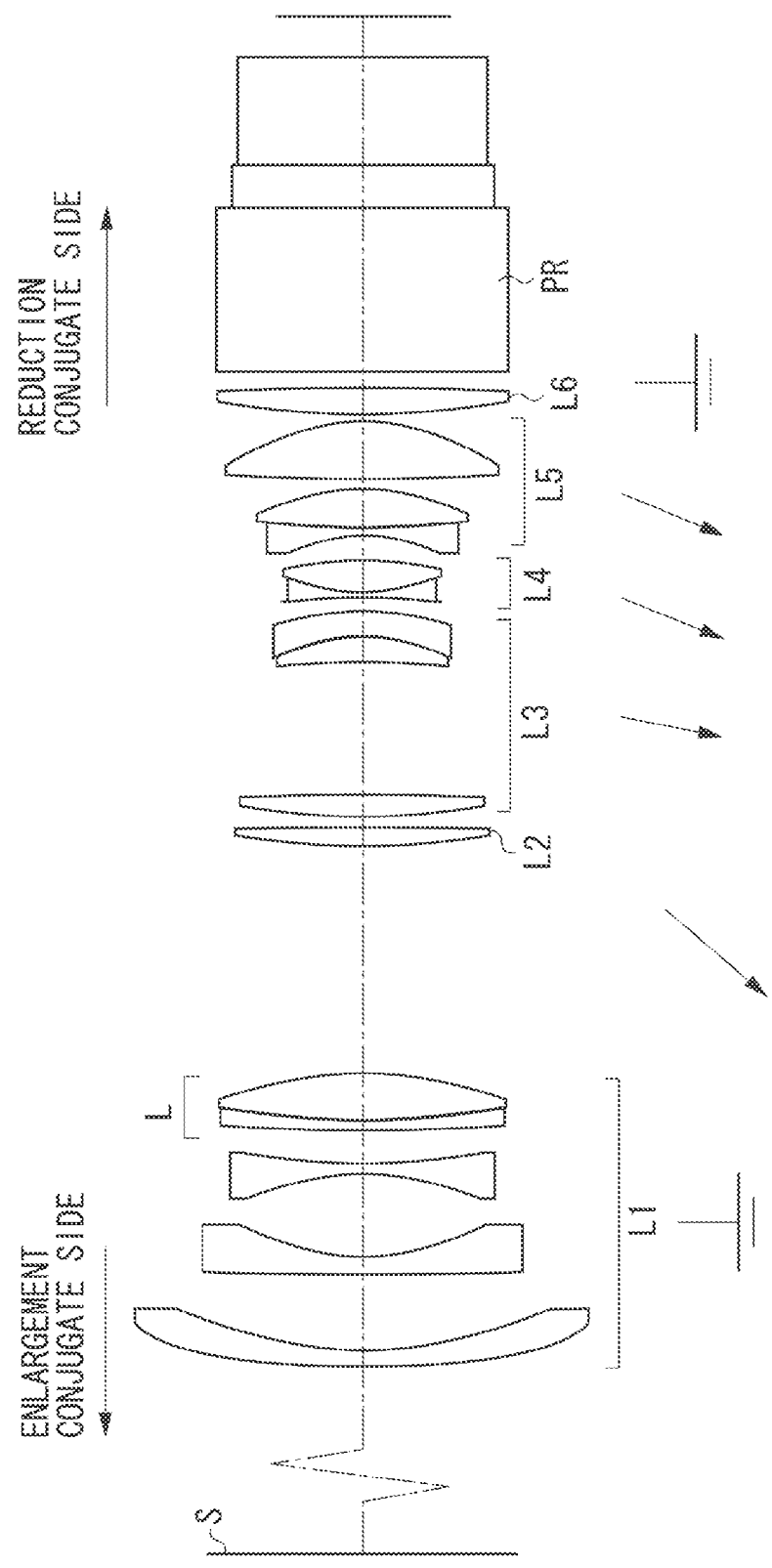

WIDE-ANGLE END

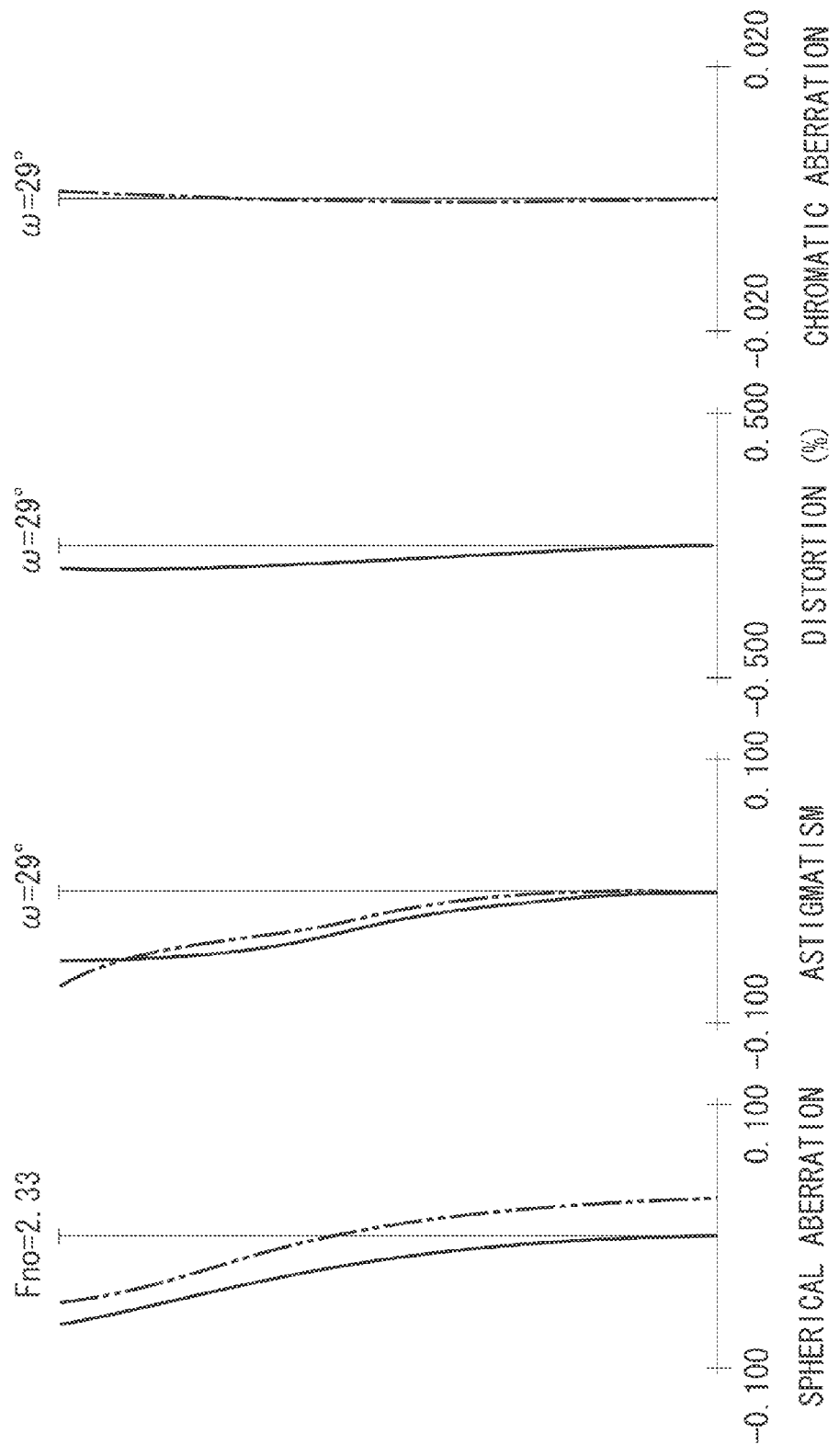

OPTICAL SYSTEM AND IMAGE PROJECTION APPARATUS INCLUDING THE SAME

BACKGROUND OF THE INVENTION

1. Field of the Invention

The present invention relates to an optical system such as one suitable as a projection optical system for use in an image projection apparatus (projector), which enlarges and projects on a screen an image formed by an image display element.

2. Description of the Related Art

An image projection apparatus (projector) enabling an image in a personal computer or a video to be projected on a large screen has been widely used for presentations and movie viewing. A projection optical system for use in the projector is required to have a wide angle of view, have little distortion, and provide a high-quality projection image with no color bleeding (no lateral chromatic aberration (chromatic aberration of magnification)). The projection optical system for use in the projector is also required to have a long back focus and be telecentric on a projected side.

As an optical system advantageous to satisfaction of these requirements, a retro-focus-type optical system has been known. The retro-focus-type optical system includes a front lens group having negative refractive power, an aperture stop, and a rear lens group having positive refractive power. In this optical system, since refractive power arrangement with respect to the aperture stop is asymmetric, various kinds of aberration, especially, lateral chromatic aberration, tend to be generated significantly. As the retro-focus-type optical system, there has been known an optical system for an image projection apparatus in which a material with significant chromatic dispersion is used for a negative lens of the front lens group to correct lateral chromatic aberration (Japanese Patent Application Laid-Open No. 2010-139766).

The retro-focus-type optical system has been widely used as a projection optical system for an image projection apparatus (projector) since the retro-focus-type optical system easily achieves a wide angle of view and relatively easily obtains a long back focus. However, in the retro-focus-type optical system, since refractive power arrangement with respect to the aperture stop is asymmetric, distortion and lateral chromatic aberration are generated significantly. Thus, favorable correction of the various kinds of aberration is a major issue.

An effective way to correct distortion in the retro-focus-type optical system is to arrange a positive lens in the front lens group at a position in which the height of incidence of a peripheral ray is high to generate positive distortion by a ray raising effect. At this time, lateral chromatic aberration is also corrected. However, since lateral chromatic aberration has a different correction effect depending on a wavelength thereof, the light having a short wavelength tends to be overcorrected.

To solve this issue, in Japanese Patent Application Laid-Open No. 2010-139766, a material with significant chromatic dispersion is used for a negative lens arranged in the front lens group at a position in which the height of incidence of a peripheral ray is high to correct lateral chromatic aberration in the light having a short wavelength that has been overcorrected. In Japanese Patent Application Laid-Open No. 2010-139766, a meniscus-shaped negative lens is used for the first lens on an enlargement side (enlargement conjugate side), and anomalous high-dispersion glass is used as a material of the first lens. With such a configuration, since a ray having a high image height is bent in an under direction, an effect of correcting lateral chromatic aberration can be obtained. At this time, in a case where refractive power of the meniscus-shaped negative lens is strengthened to widen an angle of view, axial chromatic aberration is generated in an over direction, and second-order dispersion in axial chromatic aberration of blue short-wavelength light tends to occur.

SUMMARY OF THE INVENTION

The present invention is directed to an optical system having less lateral chromatic aberration and distortion, easily providing a long back focus, having favorable telecentricity on a projected side, and having a wide angle of view by further improving an optical system discussed in Japanese Patent Application Laid-Open No. 2010-139766.

According to an aspect of the present invention, an optical system includes, in order from an enlargement side to a reduction side:

a front lens unit having negative refractive power;
a stop; and
a rear lens unit having positive refractive power,
wherein the front lens unit includes a combination lens including a negative lens and a positive lens that are adjacently arranged in order from the enlargement side to the reduction side, and
wherein, when a focal length of the negative lens is $f_N$, an Abbe number and relative partial dispersion of a material of the negative lens are $\nu_N$ and $\theta_N$, respectively, an Abbe number and relative partial dispersion of a material of the positive lens are $\nu_P$ and $\theta_P$, respectively, and a focal length of the entire optical system is $f_W$, following conditions are satisfied:

$$-20 < f_N/f_W < -2$$

$$0.01 < [\theta_N - (-0.01618\nu_N + 0.6415)] - [\theta_P - (-0.01618\nu_P + 0.6415)] < 0.20.$$

According to another aspect of the present invention, an image projection apparatus includes a light modulation element configured to modulate incident light, and the optical system configured to project light modulated by the light modulation element.

Further features of the present invention will become apparent from the following description of exemplary embodiments with reference to the attached drawings.

BRIEF DESCRIPTION OF THE DRAWINGS

FIG. 1 is a lens cross-sectional view of a first exemplary embodiment of the present invention.

FIGS. 2A and 2B are aberration diagrams at a wide-angle end and at a telephoto end, respectively, of the first exemplary embodiment of the present invention.

FIG. 3 is a lens cross-sectional view of a second exemplary embodiment of the present invention.

FIGS. 4A and 4B are aberration diagrams at a wide-angle end and at a telephoto end, respectively, of the second exemplary embodiment of the present invention.

FIG. 7 is a lens cross-sectional view of a fourth exemplary embodiment of the present invention.

FIGS. 8A and 8B are aberration diagrams at a wide-angle end and at a telephoto end, respectively, of the fourth exemplary embodiment of the present invention.

DESCRIPTION OF THE EMBODIMENTS

Various exemplary embodiments, features, and aspects of the invention will be described in detail below with reference to the drawings.

An optical system according to an exemplary embodiment of the present invention includes a front lens group (unit) having negative refractive power, a stop, and a rear lens group (unit) having positive refractive power in order from an enlargement conjugate side (enlargement side) to a reduction conjugate side (reduction side).

FIG. 1 is a lens cross-sectional view of an optical system according to a first exemplary embodiment of the present invention at a wide-angle end. FIGS. 2A and 2B are vertical aberration diagrams at a wide-angle end and at a telephoto end, respectively, of the optical system according to the first exemplary embodiment when a projection distance (a distance from the first lens surface to the screen) of the optical system is 1.508 m. (1.508 m is a distance when numerical examples are expressed in units of mm. The same is true below.) FIG. 3 is a lens cross-sectional view of an optical system according to a second exemplary embodiment of the present invention at a wide-angle end. FIGS. 4A and 4B are vertical aberration diagrams at a wide-angle end and at a telephoto end, respectively, of the optical system according to the second exemplary embodiment when a projection distance (a distance from the first lens surface to the screen) of the optical system is 1.508 m.

Figure 5:
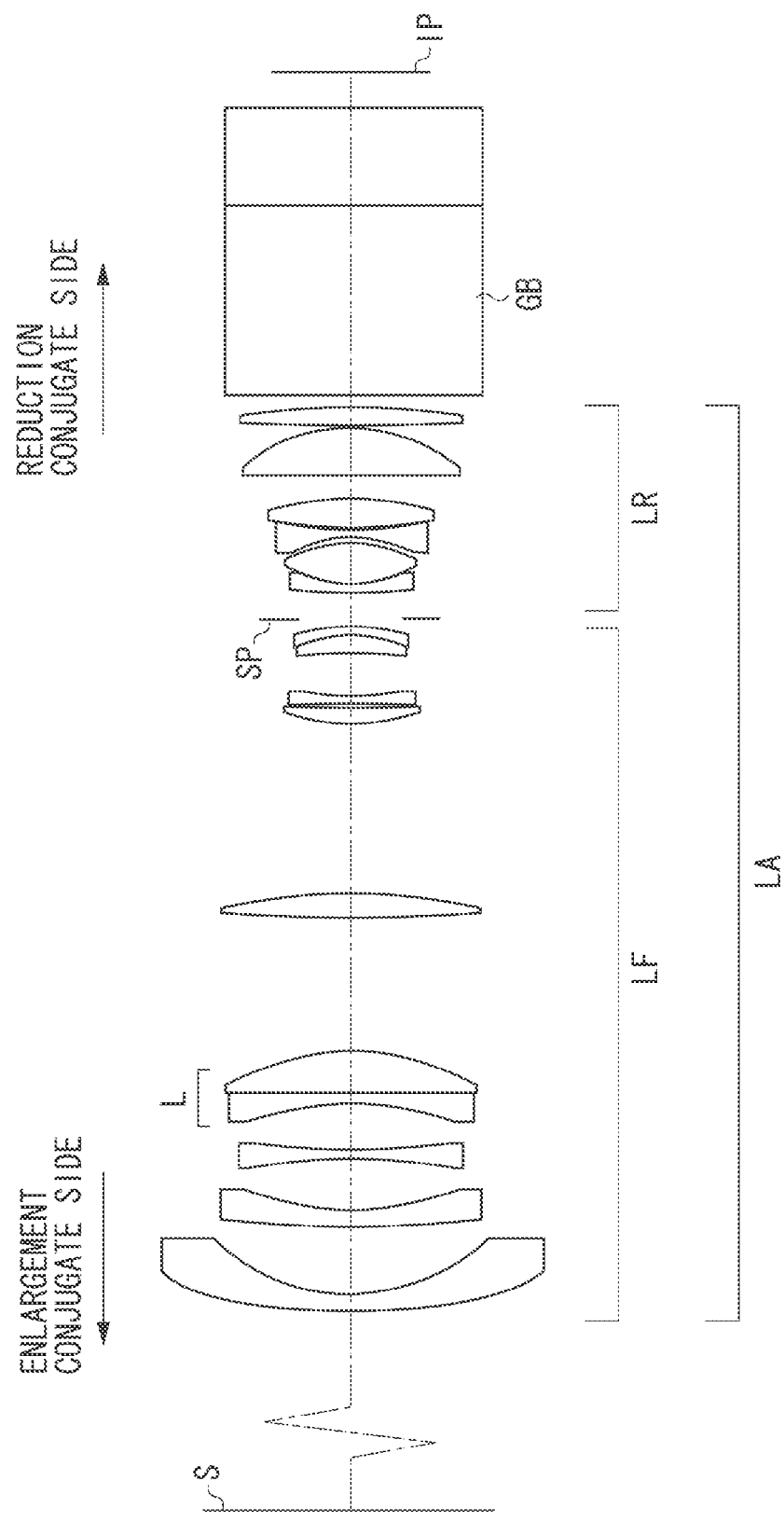
FIG. 5 is a lens cross-sectional view of a third exemplary embodiment of the present invention.
Figure 6:
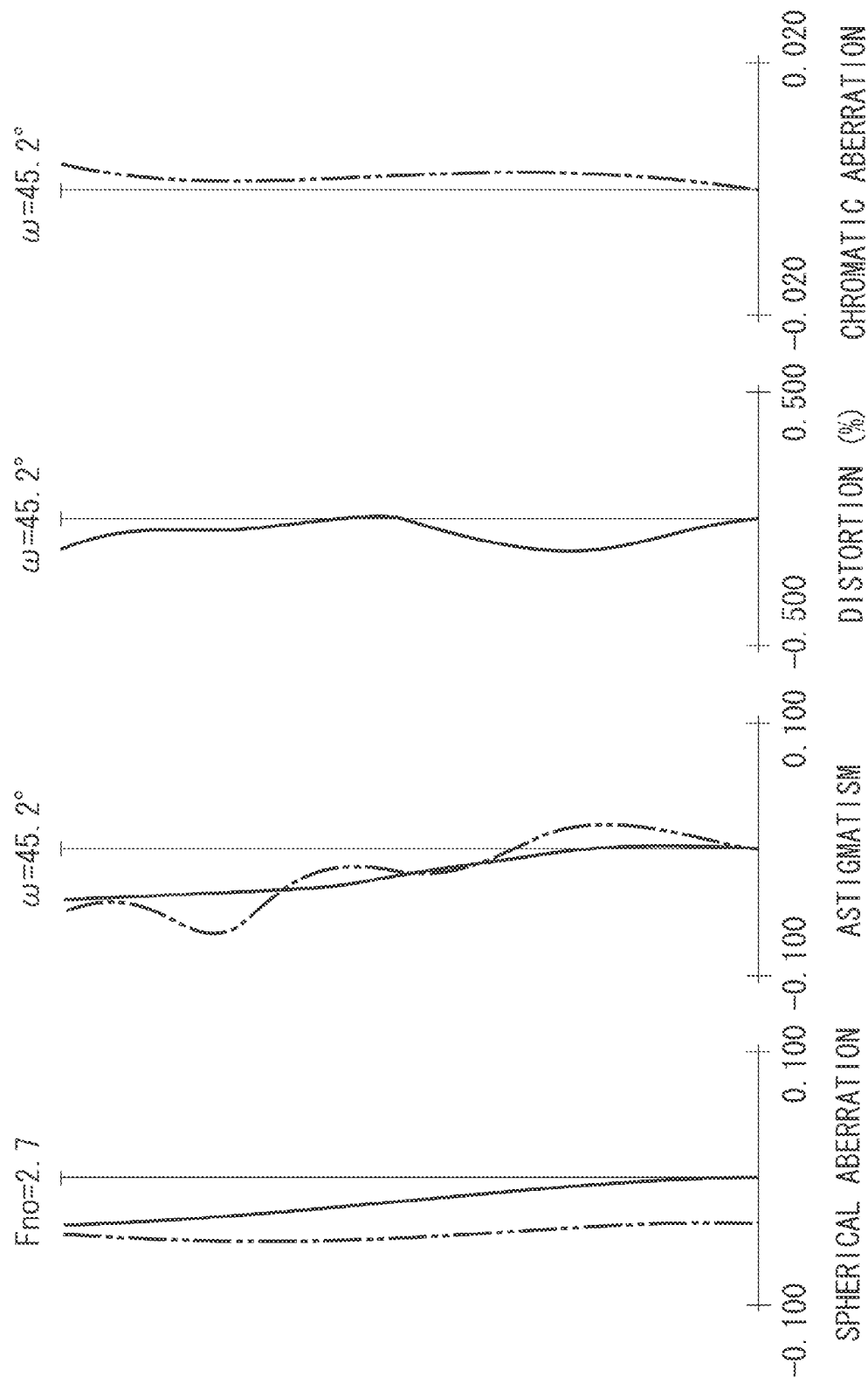
FIG. 6 is an aberration diagram of the third exemplary embodiment of the present invention.
Figure 8A:
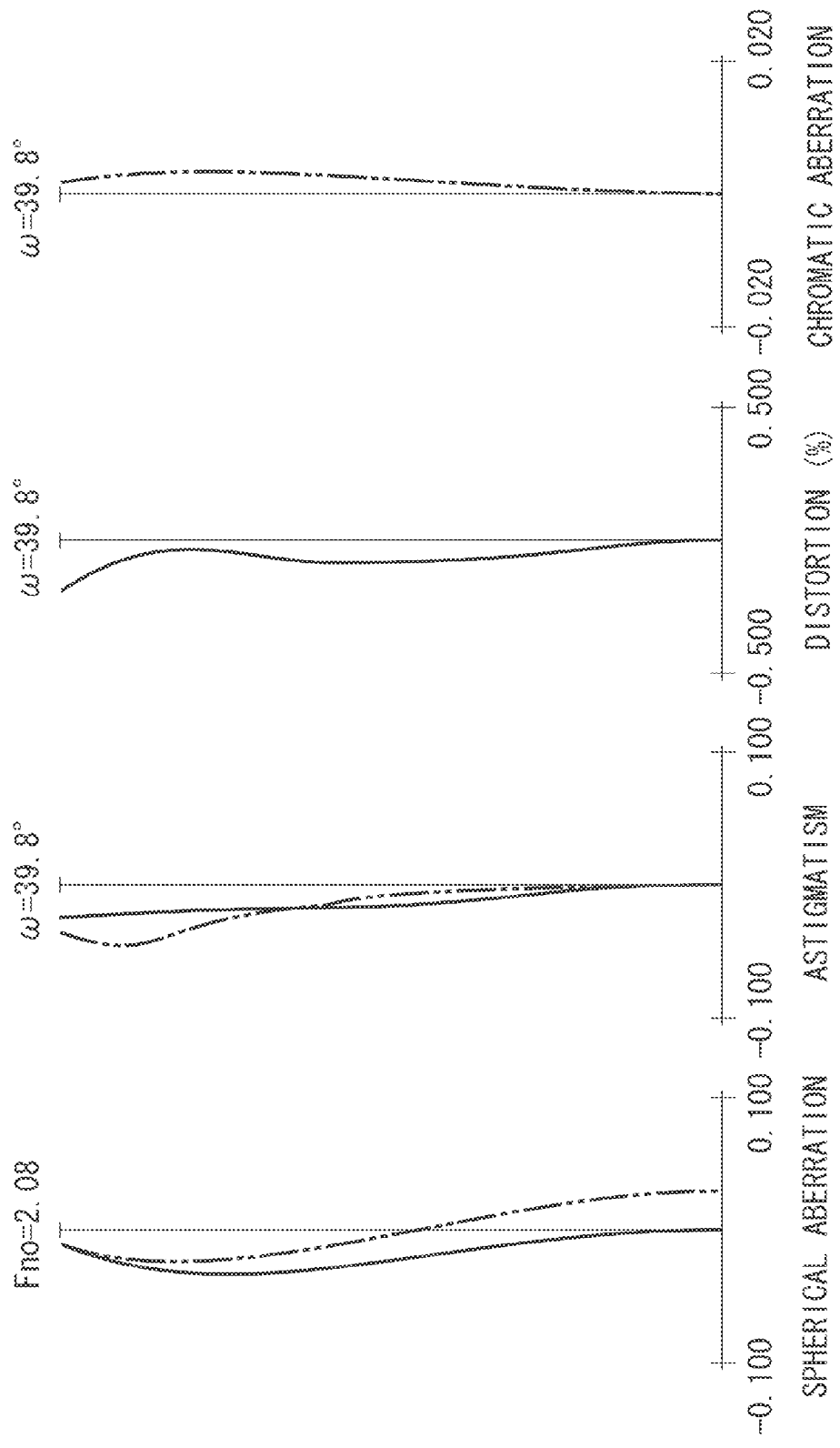
Figure 9:
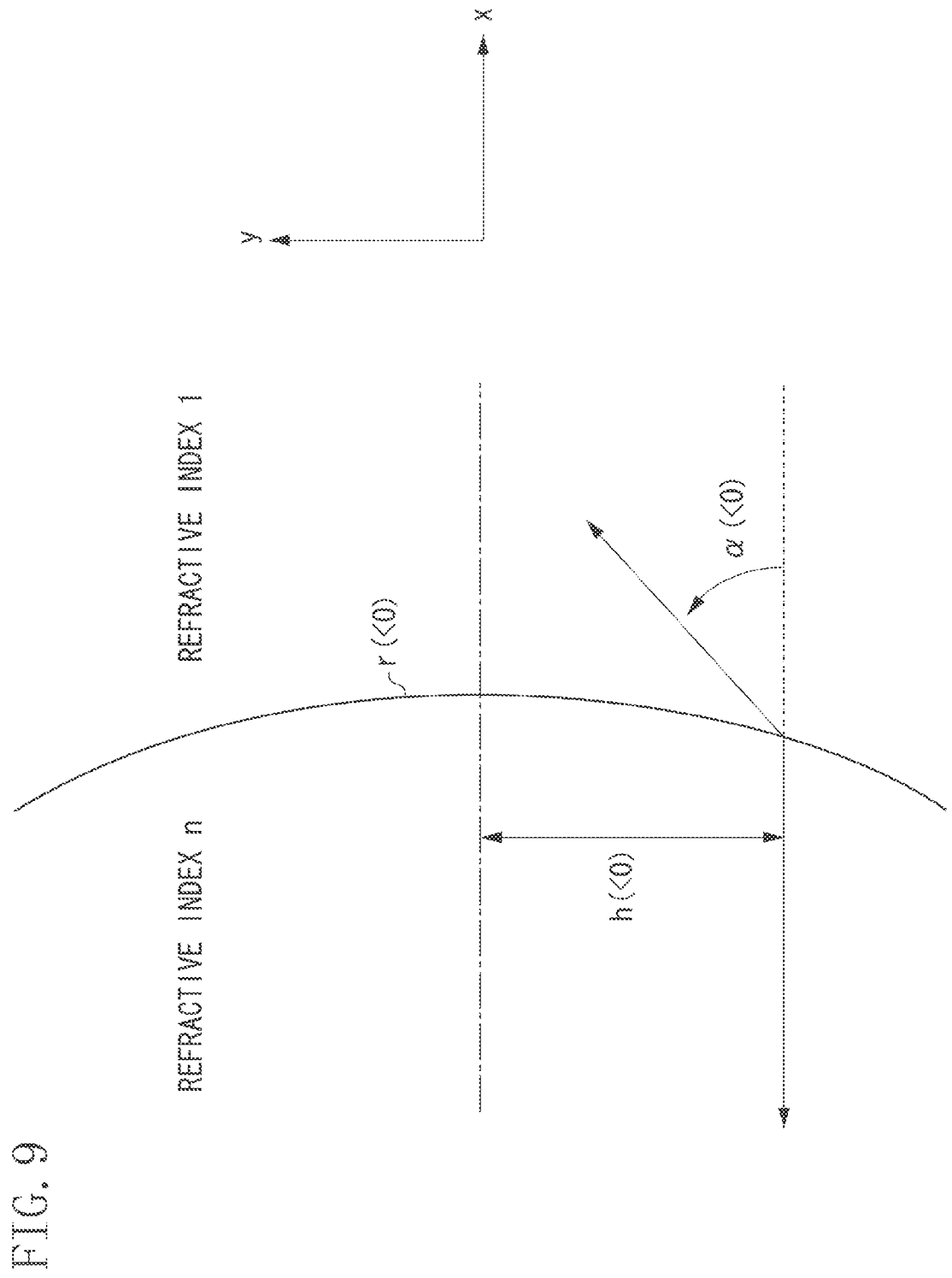
FIG. 9 illustrates an optical effect at a refractive surface.
Figure 10:
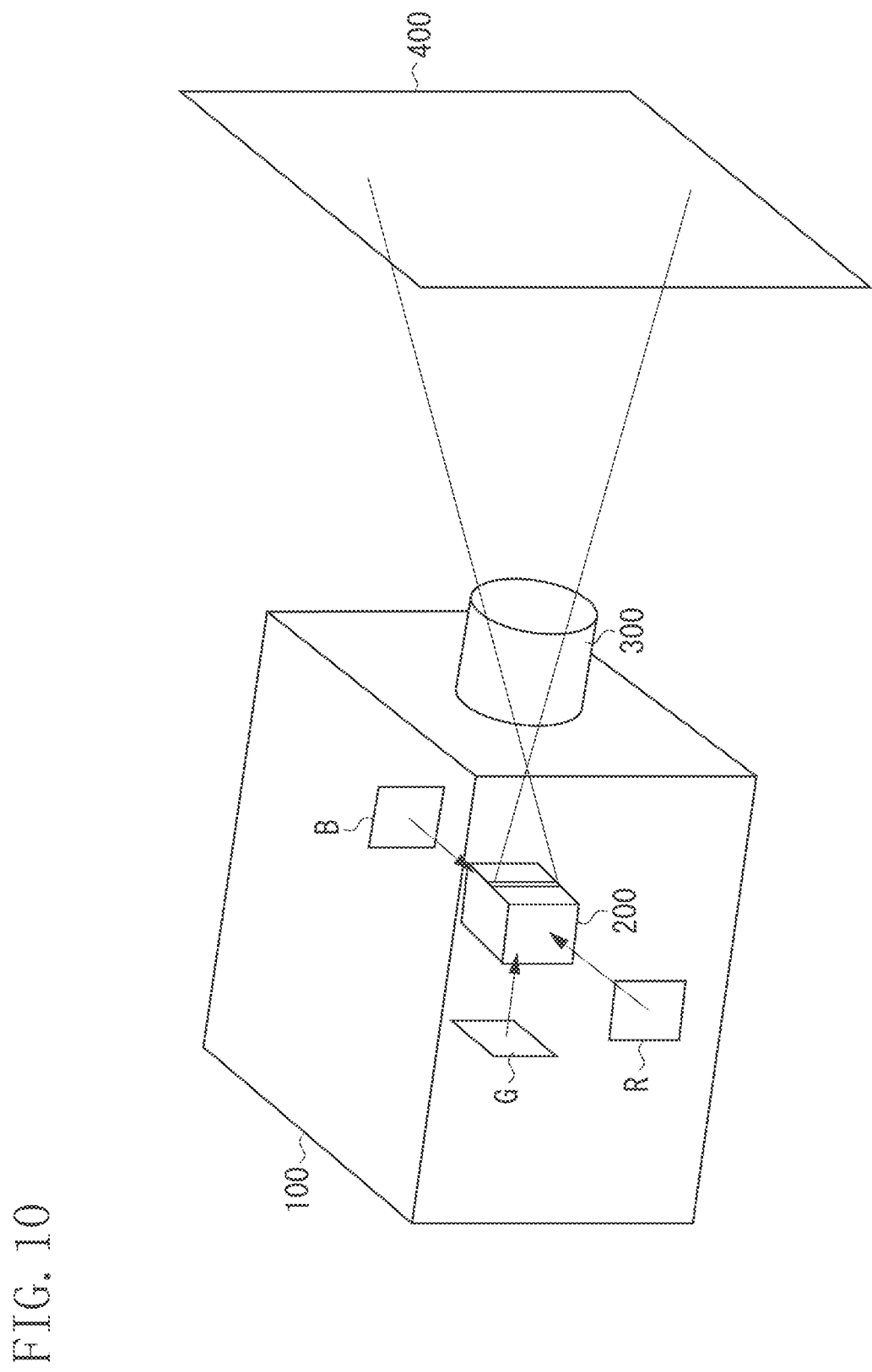
FIG. 10 is a schematic view of principal portions of an image projection apparatus according to an exemplary embodiment of the present invention.

FIG. 5 is a lens cross-sectional view of an optical system according to a third exemplary embodiment of the present invention. FIG. 6 is a vertical aberration diagram of the optical system according to the third exemplary embodiment when a projection distance of the optical system is 1.25 m. FIG. 7 is a lens cross-sectional view of an optical system according to a fourth exemplary embodiment of the present invention at a wide-angle end. FIGS. 8A and 8B are vertical aberration diagrams at a wide-angle end and at a telephoto end, respectively, of the optical system according to the fourth exemplary embodiment when a projection distance (a distance from the first lens surface to the screen) of the optical system is 1.508 m. FIG. 9 illustrates refraction of a ray at a refractive surface. FIG. 10 is a schematic view of principal portions of an image projection apparatus according to an exemplary embodiment of the present invention.

The optical system of each exemplary embodiment is a projection lens (a projection optical system) for use in the image projection apparatus (a projector). In each lens cross-sectional view, the left side is the enlargement conjugate side (the screen side) while the right side is the reduction conjugate side (the image display element side). In each lens cross-sectional view, LA denotes an optical system. The optical system LA is a lens system having a single focal length or a zoom lens having a zooming function. LF denotes a front lens group having negative refractive power while LR denotes a rear lens group having positive refractive power.

The order of a lens unit (sub-unit) from the enlargement conjugate side is represented as i, and Li denotes an i-th lens unit (sub-unit). SP denotes an aperture stop (a stop). IP denotes a plane corresponding to an original image (a projected image) such as a liquid crystal panel (an image display element). In other words, the liquid crystal panel is a light modulation element that modulates incident light. S denotes a screen surface. GB denotes an optical block corresponding to a prism for color separation and color combination, an optical filter, a face plate (a parallel plate glass), a quartz low-pass filter, and an infrared cut filter. The projection lens projects light modulated by the liquid crystal panel, as a light modulation element, onto the screen surface (the projected surface).

In FIGS. 1, 3, and 7, the arrows represent moving directions (moving loci) of the lens units during zooming from the wide-angle end to the telephoto end. When the optical system is a zoom lens capable of zooming, the wide-angle end and the telephoto end refer to zoom positions when the lens units for zooming are located at the respective ends of a mechanically movable range along an optical axis. Here, the lens unit refers to a portion separated by a lens distance along the optical axis that changes during zooming or focusing, or a portion separated by the aperture stop SP.

The optical system LA according to the first or second exemplary embodiment includes a first lens unit L1 having negative refractive power, a second lens unit L2 having positive refractive power, a third lens unit L3 having positive refractive power, and a fourth lens unit L4 having positive refractive power in order from the enlargement conjugate side to the reduction conjugate side. The optical system LA further includes a fifth lens unit L5 having negative refractive power, a sixth lens unit L6 having positive refractive power, and a seventh lens unit L7 having positive refractive power. The optical system LA is a projection optical system (a zoom lens) in which the first and seventh lens units L1 and L7 do not move for zooming while the second lens unit L2 to the sixth lens unit L6 move during zooming.

Here, the first lens unit L1 to the fourth lens unit L4 constitute the front lens group LF while the fifth lens unit L5 to the seventh lens unit L7 constitute the rear lens group LR. The optical system in the third exemplary embodiment is a projection optical system having a single focal length.

The optical system LA according to the fourth exemplary embodiment includes a first lens unit L1 having negative refractive power, a second lens unit L2 having positive refractive power, a third lens unit L3 having positive refractive power, and a fourth lens unit L4 having negative refractive power in order from the enlargement conjugate side to the reduction conjugate side. The optical system LA further includes a fifth lens unit L5 having positive refractive power and a sixth lens unit L6 having positive refractive power. The optical system LA is a projection optical system (a zoom lens) in which the first and sixth lens units L1 and L6 do not move for zooming while the second lens unit L2 to the fifth lens unit L5 move during zooming.

Here, the first lens unit L1 to the third lens unit L3 constitute the front lens group LF while the fourth lens unit L4 to the sixth lens unit L6 constitute the rear lens group LR. In each spherical aberration diagram, the solid line denotes d-line while the dashed-two dotted line denotes g-line. In each astigmatism diagram, the dashed line denotes a meridional image plane while the solid line denotes a sagittal image plane. Lateral chromatic aberration is expressed by a wavelength of 470 nm with respect to a wavelength of 550 nm. Fno denotes an F-number, and ω denotes a half angle of view.

In general, in a retro-focus-type optical system (lens system), which includes a front lens group having negative refractive power and a rear lens group having positive refractive power, distortion in an under direction (negative) is generated significantly due to asymmetry of the lens configuration. A favorable way to correct distortion is to arrange a lens having strong positive refractive power in the front lens group at a position in which the height of an off-axis principal ray is high.

With such a lens having positive refractive power, a peripheral ray is significantly raised, which generates distortion in an over direction, so that distortion can be corrected over the entire optical system. However, when the ray is raised by the lens having positive refractive power, a refraction angle difference with a wavelength caused by refractive index dispersion of a material is generated. This leads to generation of lateral chromatic aberration, and it is difficult to correct both kinds of aberration in a balanced manner in the optical system having a wide angle of view that requires correction of distortion by the lens having stronger positive refractive power.

An optical effect in this instance will be described with reference to FIG. 9. FIG. 9 illustrates a refraction angle generated by a refractive surface (lens surface) having positive refractive power. A radius of curvature of the refractive surface is denoted by r, and a refractive index of a material of the lens is denoted by n. Here, for simplicity of description, suppose that a ray enters the lens at an angle parallel to the optical axis with an incident height of h. A refraction angle a at this time is paraxially expressed as below.

$$\alpha = h \cdot \frac{1-n}{r} = h \cdot \phi$$

Here, $\phi$ denotes refractive power of the refractive surface. As illustrated in FIG. 9, h<0 and r<0 are set, and as for the angle $\alpha$, a counterclockwise direction is defined as being positive. Also, here, aberration generated in the direction of y axis is referred to as aberration in an over direction while aberration generated in the opposite direction is referred to as aberration in an under direction.

According to these definitions, the angle a in the above equation is a negative value, and the ray is bent in the over direction. Thus, this refractive surface has an effect of correcting distortion in the over direction. However, the refractive index has dispersion, and this refraction angle u differs with an arbitrary wavelength. In a case where a refractive index difference of the material with the wavelength is $\Delta n$, a variation Au of the refraction angle by the dispersion is as follows:

$$\frac{\Delta \alpha}{\Delta n} = -\frac{h}{r}$$

$$\Delta \alpha = -\frac{h}{r} \Delta n = \frac{h}{r}(1-n)\frac{\Delta n}{n-1} = h \cdot \phi \cdot \frac{\Delta n}{n-1}$$

Here, $\Delta n/(n-1)$ corresponds to a reciprocal of an Abbe number. In general, a reference refractive index n is a refractive index of d-line, $n_d$. A refractive index of F-line is $n_F$, and a refractive index of C-line is $n_C$. An Abbe number when $\Delta n$ is a refractive index difference between F-line and C-line, $n_F - n_C$, is defined as $(n_d-1)/(n_F-n_C)$, and this is expressed as $v$ here. By using this, a refraction angle difference $\Delta \alpha_{F-C}$ generated between F-line and C-line is expressed as follows:

$$\Delta \alpha_{F-C} = h \cdot \frac{\phi}{v}$$

In the case of a general glass material, $v>0$, and thus $\Delta \alpha_{F-C}<0$. In other words, F-line is bent further in the over direction, which causes generation of lateral chromatic aberration. This refractive index difference causing generation of lateral chromatic aberration is more significant at a shorter wavelength.

By multiplying the above equation by relative partial dispersion $\theta=(n_F-n_C)/(n_g-n_F)$, $\Delta \alpha_{F-C}$ can be converted into a refraction angle difference between g-line and F-line, $\Delta \alpha_{g-F}$.

$$\Delta \alpha_{g \cdot F} = \Delta \alpha_{F-C} \cdot \theta = h \cdot \frac{\phi}{v} \cdot \theta$$

Since the relative partial dispersion $\theta$ is a positive value, $\Delta \alpha_{g-F}$ is a negative value, and it is understood that g-line is refracted further in the over direction than F-line.

The optical system according to the present exemplary embodiment is in a retro-focus type and has a lens configuration with strong asymmetry. Thus, power of this refractive surface tends to be strong for correction of distortion. This causes an increase of a generation amount of lateral chromatic aberration. Also, in the above equation, the incident height h and the refraction angle are in proportional relation since the above equation is paraxially expressed. However, in the actual optical system having a wide angle of view, the higher the incident height h is, the more significantly lateral chromatic aberration is generated. Further, since variations of the refractive index are more significant on a shorter wavelength side than on a longer wavelength side, blue lateral chromatic aberration tends to be generated especially significantly. Accordingly, in the optical system having a wide angle of view, correction of blue lateral chromatic aberration tends to remain significantly.

In the optical system according to the present exemplary embodiment, a negative lens for correction of lateral chromatic aberration is arranged very close to a lens having positive refractive power (positive lens) for correction of distortion.

Next, characteristics of the optical system according to the present exemplary embodiment will be described. The optical system according to the present exemplary embodiment includes a front lens group having negative refractive power, a stop, and a rear lens group having positive refractive power in order from the enlargement conjugate side to the reduction conjugate side. The optical system according to the present exemplary embodiment is a retro-focus-type lens having a single focal length or a zoom lens. The front lens group includes a combination lens in which a negative lens $G_n$ and a positive lens $G_P$ are adjacently arranged in order from the enlargement conjugate side to the reduction conjugate side.

Here, the combination lens is a first combination lens out of combination lenses each including two lenses, a negative lens and a positive lens, in order from the enlargement conjugate side to the reduction conjugate side. A focal length of the negative lens is denoted by $f_N$, and an Abbe number and relative partial dispersion of a material of the negative lens are denoted by $v_N$ and $\theta_N$, respectively. An Abbe number and relative partial dispersion of a material of the positive lens are denoted by $v_P$ and $\theta_P$, respectively. A focal length of the entire optical system is denoted by $f_W$. When the optical system is a zoom lens, the focal length $f_W$ is a focal length of the entire zoom lens at a wide-angle end. At this time, Conditions (1) and (2) are satisfied.

$$-20 < f_N/f_W < -2 \quad (1)$$

$$0.01 < [\theta_N - (-0.01618 v_N + 0.6415)] - [\theta_P - (-0.01618 v_P + 0.6415)] < 0.20 \quad (2)$$

In each exemplary embodiment, refractive power of a positive lens in one lens component constituting the optical system is denoted by $\phi_P = 1/f_P$, and refractive power of a negative lens in the lens component is denoted by $\phi_N = 1/f_N$. To calculate an angle deviation at each refractive power, the equation can be expanded and applied as it is. That is, a refraction angle difference of the positive lens is denoted by $\Delta\alpha_{F\text{-}C}(P)$, $\Delta\alpha_{g\text{-}F}(P)$, and a refraction angle difference of the negative lens is denoted by $\Delta\alpha_{F\text{-}C}(N)$, $\Delta\alpha_{g\text{-}F}(N)$. At this time, equations are as follows.

$$\Delta\alpha_{F\text{-}C}(P) = \frac{h}{v_P \cdot f_P}$$

$$\Delta\alpha_{F\text{-}C}(N) = \frac{h}{v_N \cdot f_N}$$

$$\Delta\alpha_{g\text{-}F}(P) = \frac{h}{v_P \cdot f_P} \cdot \theta_P$$

$$\Delta\alpha_{g\text{-}F}(N) = \frac{h}{v_N \cdot f_N} \cdot \theta_N$$

Since $\phi_P > 0$, $\phi_N < 0$, this leads to $\Delta\alpha(P) < 0$, $\Delta\alpha(N) > 0$, and it is understood that the positive lens produces a chromatic angle deviation in the over direction while the negative lens produces a chromatic angle deviation in the under direction. A favorable way to appropriately correct lateral chromatic aberration is to appropriately set the ratio of the angle deviation of the positive lens to that of the negative lens.

Meanwhile, in the optical system according to the present exemplary embodiment, since the positive lens and the negative lens are arranged very close to each other, the height of incidence h of a ray can be regarded as being equal and is thus canceled during calculation of the ratio.

$$\frac{\Delta\alpha_{F\text{-}C}(N)}{\Delta\alpha_{F\text{-}C}(P)} = \frac{v_P \cdot f_P}{v_N \cdot f_N}$$

Since this equation indicates the ratio of the chromatic angle deviation in the over direction by the positive lens to the chromatic angle deviation in the under direction by the negative lens, a value thereof is a negative value. By determining this ratio appropriately in consideration of balance with aberration of the entire optical system, lateral chromatic aberration can be corrected favorably. In the lens system having a wide angle of view, the ratio can be set to Condition (3) according to the degree of aberration.

$$-4.0 < (v_P \cdot f_P)/(v_N \cdot f_N) < -0.2 \quad (3)$$

With this configuration, correction can be performed favorably. In Condition (3), in a case where the value exceeds an upper limit, correction of lateral chromatic aberration is insufficient. Conversely, in a case where the value falls below a lower limit, excessive correction is performed, and image quality is deteriorated.

Also, by replacing Condition (3) with Condition (3a), correction can be performed more favorably.

$$-3.0 < (v_P \cdot f_P)/(v_N \cdot f_N) < -0.4 \quad (3a)$$

Similarly, lateral chromatic aberration to be generated between g-line and F-line needs to be considered as well. In the optical system having a wide angle of view, since it is important to correct the blue side more strongly, it is desirable to correct chromatic aberration between g-line and F-line more strongly than that between F-line and C-line. A refractive index difference of the positive lens $\Delta\alpha_{g\text{-}F}(P)$ and a refractive index difference of the negative lens $\Delta\alpha_{g\text{-}F}(N)$ generated between g-line and F-line are as follows:

$$\frac{\Delta\alpha_{g\text{-}F}(N)}{\Delta\alpha_{g\text{-}F}(P)} = \frac{\theta_N}{\theta_P} \cdot \frac{v_P \cdot f_P}{v_N \cdot f_N}$$

$$\frac{\left(\frac{\theta_N}{\theta_P} \cdot \frac{v_P \cdot f_P}{v_N \cdot f_N}\right)}{\left(\frac{v_P \cdot f_P}{v_N \cdot f_N}\right)} = \frac{\theta_N}{\theta_P}$$

This equation indicates the ratio of the strength of g-F chromatic aberration correction to the strength of F-C chromatic aberration correction, and in the optical system having a wide angle of view, it is desirable to set the ratio to satisfy the following condition:

$$1.0 < \theta_N/\theta_P < 1.3 \quad (4)$$

Chromatic aberration correction on the short wavelength side is insufficient in a case where the value falls below a lower limit of Condition (4) while excessive correction is performed in a case where the value exceeds an upper limit. It is more desirable that Condition (4) meets Condition (4a).

$$1.05 < \theta_N/\theta_P < 1.20 \quad (4a)$$

Also, the relative partial dispersion θ has a standard line indicated as the below equation when a horizontal axis is the Abbe number while a vertical axis is the relative partial dispersion.

$$\theta(v) = -0.01618v + 0.6415$$

To select the material, by choosing the relative partial dispersion values $\theta_N$ and $\theta_P$ from an upper side and a lower side of the standard line, respectively, more effective correction can be performed. In a case where separation amounts of the relative partial dispersion values $\theta_N$ and $\theta_P$ from the standard line are $$\Delta\theta_N = \theta_N - \theta(v_N)$$

$$\Delta\theta_P = \theta_P - \theta(v_P),$$

it is desirable to select the material to satisfy:

$$0.01 < \Delta\theta_N - \Delta\theta_P < 0.20$$

that is, $$0.01 < [\theta_N - (-0.01618v_N + 0.6415)] - [\theta_P - (-0.01618v_P + 0.6415)] < 0.20 \quad (2)$$

In a case where the value falls below a lower limit of Condition (2), a correction effect is insufficient. In a case where the value exceeds an upper limit, correction is excessive. More favorably, by replacing Condition (2) with Condition (2a), more effective correction can be obtained.

$$0.03 < [\theta_N - (-0.01618v_N + 0.6415)] - [\theta_P - (-0.01618v_P + 0.6415)] < 0.10 \quad (2a)$$

When the focal length of the negative lens is too long, it is difficult to obtain a predetermined correction effect. When the focal length is too short, it is difficult to obtain a correction effect of distortion. Thus, the focal length needs to be set in an appropriate range. The focal length of the entire optical system (the focal length of the entire optical system at a wide-angle end in the case of a zoom lens) is denoted by $f_W$. At this time, setting the focal length of the negative lens to Condition (1) is favorable.

$$-20 < f_N/f_W < -2 \quad (1)$$

Further, replacing Condition (1) with Condition (1a) is favorable.

$$-13 < f_N/f_W < -3 \quad (1a)$$

Also, as for a refractive index of a material of the positive lens $n_P$ and a refractive index of a material of the negative lens $n_N$, Condition (5) is favorable.

$$n_P < n_N \quad (5)$$

This facilitates restriction of a difference in curvature of field by color. Especially, Condition (6) is favorable.

$$0.1 < n_N - n_P \quad (6)$$

Further, Condition (6a) is more favorable.

$$0.15 < n_N - n_P < 0.30 \quad (6a)$$

Also, a projection angle of view of the optical system in each exemplary embodiment when the optical system in each exemplary embodiment is used in an image projection apparatus that projects an original image formed by an image display element that forms an original image is 2ω (degree) (note that a projection angle of view at a wide-angle end is 2ω when the optical system is a zoom lens). At this time, satisfying Condition (7) is favorable.

$$60° < 2\omega \quad (7)$$

Further, condition (7a) is more favorable.

$$70° < 2\omega < 100° \quad (7a)$$

As described above, according to each exemplary embodiment, it is possible to obtain an optical system suitable for a projector having a long back focus as well as a wide angle of view, having high telecentricity, having less distortion, and having favorable projection performance.

Next, the optical systems according to the respective exemplary embodiments will be described. The optical system LA according to the first and second exemplary embodiments is a zoom lens, the front lens group LF has a plurality of lens units, the rear lens group LR has a plurality of lens units, and distances between the lens units change during zooming. Specifically, the front lens group LF includes the first lens unit L1 having negative refractive power, the second lens unit L2 having positive refractive power, the third lens unit L3 having positive refractive power, and the fourth lens unit L4 having positive refractive power in order from the enlargement conjugate side to the reduction conjugate side.

The rear lens group LR includes the fifth lens unit L5 having negative refractive power, the sixth lens unit L6 having positive refractive power, and the seventh lens unit L7 having positive refractive power. The first and seventh lens units L1 and L7 do not move for zooming while the second lens unit L2 to the sixth lens unit L6 move during zooming.

The first exemplary embodiment uses a combination lens L in the first lens unit L1. The combination lens L in the first exemplary embodiment is a cemented lens composed of a negative lens and a positive lens in order from the enlargement conjugate side to the reduction conjugate side. First and second lenses on the enlargement conjugate side have aspheric surfaces. The first exemplary embodiment provides a zoom lens having distortion of 0.1% or less and favorably correcting lateral chromatic aberration.

The second exemplary embodiment has, in the first lens unit, a combination lens L including a negative lens and a positive lens in order from the enlargement conjugate side to the reduction conjugate side. The negative lens and the positive lens in the combination lens L in the second exemplary embodiment are independent from each other. An air lens formed by the negative lens and the positive lens constituting the combination lens L has positive refractive power. The air lens having such refractive power does not generate chromatic aberration and effectively corrects distortion. Accordingly, refractive power of the negative lens can be weakened further than in the case of the first exemplary embodiment. Other configurations and effects are similar to those of the first exemplary embodiment.

The third exemplary embodiment is an optical system having a wide angle of view and a single focal length. In a retro-focus-type optical system having a wide angle of view, blue lateral chromatic aberration appears more significantly. The present exemplary embodiment provides the optical system in which distortion and lateral chromatic aberration have been favorably corrected despite the wide angle of view.

The fourth exemplary embodiment has a similar configuration to that of the first exemplary embodiment and has a six-unit configuration by decreasing the number of zoom moving units by one. This enables simplification of the configuration.

Next, an exemplary embodiment of an image projection apparatus (projector) to which the optical system according to the present exemplary embodiment has been applied will be described with reference to FIG. 10. FIG. 10 illustrates an image projection apparatus which, by applying the optical system according to each of the first to fourth exemplary embodiments to a three-chip color liquid crystal projector, combines image information of a plurality of color light beams based on a plurality of liquid crystal display elements via a color combining unit and enlarges and projects the image information onto a screen by the optical system for projection.

In FIG. 10, a color liquid crystal projector 100 has three panels of R, G, and B. The color liquid crystal projector 100 also has a prism 200 as a color combining unit that combines respective color light beams of R, G, and B. The color liquid crystal projector 100 combines the color light beams into one light path and projects the light onto a screen 400 with use of a projection lens 300 as the optical system. In this manner, by applying the optical system according to each of the first to fourth exemplary embodiments to the projector, the image projection apparatus (optical apparatus) with high optical performance can be obtained.

Next, data of numerical examples in the respective exemplary embodiments of the present invention is listed below. In the numerical examples, i represents an order of a surface from the enlargement conjugate side, ri represents a radius lf curvature of a lens surface, di represents a lens thickness or an air distance between the i-th surface and the (i+1)th surface, and ndi and vdi respectively represent a refractive index and an Abbe number at d-line. Also, θ represents relative partial dispersion between g-line and F-line.

An effective diameter represents a diameter of an effective region on the surface through which a ray passes. Also, three surfaces on the reduction conjugate side correspond to an optical block. A surface provided on the right side of a surface number thereof with "*" is in an aspheric surface shape according to the following function.

k, A4, A6, A8, A10, A12, A14, A16, A18, and A20 are aspheric coefficients. The aspheric surface shape is defined as the below equation when displacement in a direction of an optical axis at a position of height Y from the optical axis is x with reference to a surface vertex. Here, R is a radius of curvature.

$$X = \frac{Y^2/R}{1 + \sqrt{1 - (1+K)(Y/R)^2}} + A_4 Y^4 + A_6 Y^6 + A_8 Y^8 + A_{10} Y^{10} + A_{12} Y^{12} + A_{14} Y^{14} + A_{16} Y^{16} + A_{18} Y^{18} + A_{20} Y^{20}$$

Also, the relationship between the respective exemplary embodiments and values of the conditions is listed in Table-1.

Numerical Example 1

Surface data

| Surface no. | r | d | nd | vd | Effective diameter | θ |
|---|---|---|---|---|---|---|
| 1* | 219.488 | 3.00 | 1.51633 | 64.1 | 62.34 | |
| 2 | 31.357 | 16.34 | | | 49.34 | |
| 3* | 68.116 | 3.28 | 1.77250 | 49.6 | 40.51 | |
| 4 | 29.195 | 14.77 | | | 34.90 | |
| 5 | −30.980 | 1.80 | 1.59522 | 67.7 | 33.15 | |
| 6 | 146.872 | 4.88 | | | 34.89 | |
| 7 | 190.933 | 2.00 | 1.92286 | 18.9 | 37.26 | 0.6495 |
| 8 | 75.488 | 8.97 | 1.72047 | 34.7 | 37.89 | 0.5834 |
| 9 | −44.004 | (Variable) | | | 38.60 | |
| 10 | 66.457 | 3.83 | 1.48749 | 70.2 | 34.76 | |
| 11 | 520.687 | (Variable) | | | 34.43 | |
| 12 | 110.783 | 3.27 | 1.80809 | 22.8 | 32.93 | |
| 13 | −559.048 | (Variable) | | | 32.54 | |
| 14 | 335.957 | 5.16 | 1.51633 | 64.1 | 24.63 | |
| 15 | −26.312 | 3.50 | 1.88300 | 40.8 | 24.36 | |
| 16 | −39.169 | (Variable) | | | 24.79 | |
| 17 (Stop) | ∞ | 0.75 | | | 19.91 | |
| 18 | −66.375 | 1.30 | 1.85026 | 32.3 | 19.92 | |
| 19 | 26.831 | 5.44 | 1.51633 | 64.1 | 20.01 | |
| 20 | −47.104 | (Variable) | | | 20.93 | |
| 21 | −23.871 | 1.50 | 1.85026 | 32.3 | 22.43 | |
| 22 | 93.367 | 6.45 | 1.51633 | 64.1 | 26.19 | |
| 23 | −29.986 | 0.50 | | | 28.21 | |
| 24 | 156.797 | 10.05 | 1.43875 | 94.9 | 33.15 | |
| 25 | −30.236 | (Variable) | | | 35.25 | |
| 26 | 77.314 | 5.30 | 1.80809 | 22.8 | 37.88 | |
| 27 | −302.740 | 2.75 | | | 37.62 | |
| 28 | ∞ | 37.84 | 1.51633 | 64.1 | 40.00 | |
| 29 | ∞ | 19.50 | 1.80518 | 25.4 | 40.00 | |
| 30 | ∞ | | | | 40.00 | |
| Image plane | ∞ | | | | | |

Aspheric surface data

First surface

K = 0　　A4 = 7.17103e−006　　A6 = −5.60430e−009
A8 = 6.08849e−012　　A10 = −3.74125e−015　　A12 = 1.32338e−018

Third surface

K = 0　　A4 = −4.10143e−006　　A6 = 1.70376e−009
A8 = 3.97816e−013　　A10 = −1.03186e−014　　A12 = 1.07533e−017

Various data
Zoom ratio 1.50

| | Wide-angle | Middle | Telephoto |
|---|---|---|---|
| Focal length | 15.70 | 19.31 | 23.56 |
| F-number | 2.11 | 2.23 | 2.34 |
| Half angle of view (degree) | 39.7 | 34.0 | 29.0 |
| Image height | 13.1 | 13.1 | 13.1 |
| Total lens length | 247.34 | 247.34 | 247.34 |
| BF (back focus) | 45.76 | 45.76 | 45.76 |
| d9 | 41.72 | 22.44 | 5.22 |
| d11 | 2.00 | 7.34 | 11.47 |
| d13 | 26.79 | 27.56 | 26.81 |
| d16 | 1.20 | 4.28 | 9.17 |
| d20 | 5.21 | 4.78 | 2.87 |
| d25 | 1.00 | 11.52 | 22.38 |

Zoom lens unit data

| Unit | Start surface | Focal length |
|---|---|---|
| 1 | 1 | −38.00 |
| 2 | 10 | 155.84 |
| 3 | 12 | 114.67 |
| 4 | 14 | 94.20 |
| 5 | 17 | −75.13 |
| 6 | 21 | 269.49 |
| 7 | 26 | 76.69 |

Numerical Example 2

| Surface no. | r | d | nd | vd | Effective diameter | θ |
|---|---|---|---|---|---|---|
| 1* | 545.489 | 3.00 | 1.51633 | 64.1 | 62.99 | |
| 2 | 60.029 | 12.35 | | | 56.94 | |
| 3* | 156.652 | 3.00 | 1.77250 | 49.6 | 44.72 | |
| 4 | 27.556 | 19.19 | | | 36.43 | |
| 5 | −36.914 | 1.80 | 1.59522 | 67.7 | 33.60 | |
| 6 | 201.069 | 6.62 | | | 34.77 | |
| 7 | −266.353 | 2.00 | 1.92286 | 18.9 | 36.72 | 0.6495 |
| 8 | 347.120 | 0.30 | | | 37.57 | |
| 9 | 210.260 | 7.55 | 1.72047 | 34.7 | 37.99 | 0.5834 |
| 10 | −42.892 | (Variable) | | | 38.60 | |
| 11 | 106.207 | 3.49 | 1.48749 | 70.2 | 36.10 | |
| 12 | −4185.435 | (Variable) | | | 35.93 | |
| 13 | 74.561 | 3.97 | 1.76182 | 26.5 | 35.13 | |
| 14 | 4474.990 | 16.01 | | | 34.56 | |
| 15 | ∞ | (Variable) | | | 28.20 | (Flare-cut stop) |
| 16 | 237.197 | 5.34 | 1.51633 | 64.1 | 25.48 | |
| 17 | −26.786 | 3.06 | 1.88300 | 40.8 | 25.21 | |
| 18 | −40.110 | (Variable) | | | 25.59 | |
| 19 (Stop) | ∞ | 0.69 | | | 20.44 | |
| 20 | −75.983 | 1.30 | 1.85026 | 32.3 | 20.45 | |
| 21 | 23.251 | 6.37 | 1.51633 | 64.1 | 20.76 | |
| 22 | −37.163 | (Variable) | | | 21.54 | |
| 23 | −22.979 | 1.50 | 1.85026 | 32.3 | 22.07 | |
| 24 | 216.614 | 0.30 | | | 25.16 | |
| 25 | 140.186 | 5.86 | 1.51633 | 64.1 | 26.06 | |
| 26 | −31.193 | 1.84 | | | 27.75 | |
| 27 | −283.515 | 7.00 | 1.43875 | 94.9 | 31.59 | |
| 28 | −27.977 | (Variable) | | | 32.89 | |
| 29 | 77.314 | 5.30 | 1.80809 | 22.8 | 35.42 | |
| 30 | −302.740 | 2.75 | | | 35.26 | |
| 31 | ∞ | 37.84 | 1.51633 | 64.1 | 40.00 | |
| 32 | ∞ | 19.50 | 1.80518 | 25.4 | 40.00 | |
| 33 | ∞ | | | | 40.00 | |
| Image plane | ∞ | | | | | |

Aspheric surface data

First surface

K = 0　　A4 = 7.71589e−006　　A6 = −6.26043e−009
A8 = 8.48317e−012　　A10 = −8.17005e−015　　A12 = 4.99409e−018
A14 = −8.72477e−022　　A16 = 1.17602e−024　　A18 = −2.66693e−027
A20 = 1.37909e−030

Third surface

K = 0　　A4 = −5.80139e−006　　A6 = 4.26527e−009
A8 = 5.15960e−012　　A10 = −2.09990e−014　　A12 = −5.12328e−019
A14 = 8.95205e−020　　A16 = −7.33804e−023　　A18 = −1.42487e−025
A20 = 1.71252e−028

Various data
Zoom ratio 1.50

| | Wide-angle | Middle | Telephoto |
|---|---|---|---|
| Focal length | 15.71 | 19.32 | 23.57 |
| F number | 2.09 | 2.22 | 2.34 |
| Half angle of view (degree) | 39.7 | 34.0 | 29.0 |
| Image height | 13.1 | 13.1 | 13.1 |
| Total lens length | 247.35 | 247.35 | 247.35 |
| BF | 45.76 | 45.76 | 45.76 |

-continued

| | | | |
|---|---|---|---|
| d10 | 41.52 | 21.29 | 5.02 |
| d12 | 1.00 | 7.07 | 9.13 |
| d15 | 14.56 | 14.99 | 14.63 |
| d18 | 1.20 | 4.66 | 9.33 |
| d22 | 2.88 | 3.33 | 2.65 |
| d28 | 1.00 | 10.83 | 21.40 |

Zoom lens unit data

| Unit | Start surface | Focal length |
|---|---|---|
| 1 | 1 | −36.35 |
| 2 | 11 | 212.53 |
| 3 | 13 | 99.49 |
| 4 | 16 | 92.19 |
| 5 | 19 | −98.38 |
| 6 | 23 | 878.28 |
| 7 | 29 | 76.69 |

Numerical Example 3

| Surface no. | r | d | nd | vd | Effective diameter | θ |
|---|---|---|---|---|---|---|
| 1* | 847.458 | 3.00 | 1.65100 | 56.2 | 59.68 | |
| 2 | 28.102 | 13.60 | | | 45.18 | |
| 3* | 63.747 | 3.00 | 1.77250 | 49.6 | 39.91 | |
| 4 | 36.375 | 10.66 | | | 35.60 | |
| 5 | −86.215 | 1.80 | 1.59522 | 67.7 | 34.28 | |
| 6 | 119.429 | 9.23 | | | 34.20 | |
| 7 | −44.775 | 2.00 | 1.92286 | 18.9 | 34.76 | 0.6495 |
| 8 | 1714.442 | 8.42 | 1.65412 | 39.7 | 37.42 | 0.5737 |
| 9 | −33.074 | 26.40 | | | 38.60 | |
| 10 | 197.128 | 5.33 | 1.72825 | 28.5 | 40.01 | |
| 11 | −72.257 | 33.64 | | | 39.92 | |
| 12 | 29.603 | 3.08 | 1.80809 | 22.8 | 19.90 | |
| 13 | 185.070 | 0.65 | | | 18.93 | |
| 14 | −407.908 | 1.60 | 1.77250 | 49.6 | 18.60 | |
| 15 | 31.864 | 8.85 | | | 17.06 | |
| 16 | −75.223 | 3.59 | 1.48749 | 70.2 | 16.24 | |
| 17 | −17.417 | 1.60 | 1.88300 | 40.8 | 16.32 | |
| 18 | −24.703 | 1.30 | | | 16.86 | |
| 19 (Stop) | ∞ | 5.72 | | | 16.39 | |
| 20 | 87.982 | 1.60 | 1.85026 | 32.3 | 18.18 | |
| 21 | 17.503 | 7.94 | 1.51633 | 64.1 | 18.40 | |
| 22 | −17.841 | 1.26 | | | 19.33 | |
| 23 | −16.468 | 1.60 | 1.85026 | 32.3 | 19.25 | |
| 24 | 49.812 | 6.27 | 1.51633 | 64.1 | 22.81 | |
| 25 | −33.178 | 4.38 | | | 25.03 | |
| 26 | 598.893 | 9.69 | 1.43875 | 94.9 | 31.57 | |
| 27 | −23.442 | 0.50 | | | 33.12 | |
| 28 | 397.652 | 3.30 | 1.80809 | 22.8 | 33.99 | |
| 29 | −109.486 | 2.75 | | | 34.07 | |
| 30 | ∞ | 37.84 | 1.51633 | 64.1 | 40.00 | |
| 31 | ∞ | 19.50 | 1.80518 | 25.4 | 40.00 | |
| 32 | ∞ | | | | 40.00 | |
| Image plane | ∞ | | | | | |

Aspheric surface data

First surface

| | | |
|---|---|---|
| K = 0 | A4 = 1.36304e−005 | A6 = −1.77502e−008 |
| A8 = 2.19429e−011 | A10 = −1.54325e−014 | A12 = 5.27346e−018 |

Third surface

| | | |
|---|---|---|
| K = 0 | A4 = −1.34503e−005 | A6 = 8.29440e−009 |
| A8 = −8.27574e−013 | A10 = −2.30687e−014 | A12 = 2.89696e−017 |

| | |
|---|---|
| Focal length | 13.0 |
| F number | 2.7 |
| Half angle of view (degree) | 45.2 |
| Image height | 13.1 |

-continued

| | |
|---|---|
| Total lens length | 247.30 |
| BF | 45.66 |

Single lens data

| Lens | Start surface | Focal length |
|---|---|---|
| 1 | 1 | −44.71 |
| 2 | 3 | −115.17 |
| 3 | 5 | −83.85 |
| 4 | 7 | −47.26 |
| 5 | 8 | 49.70 |
| 6 | 10 | 73.22 |
| 7 | 12 | 43.23 |
| 8 | 14 | −38.20 |
| 9 | 16 | 45.57 |
| 10 | 17 | −74.56 |
| 11 | 20 | −25.97 |
| 12 | 21 | 18.53 |
| 13 | 23 | −14.40 |
| 14 | 24 | 39.59 |
| 15 | 26 | 51.66 |
| 16 | 28 | 106.55 |

Numerical Example 4

| Surface no. | r | d | Nd | vd | Effective diameter | θ |
|---|---|---|---|---|---|---|
| 1* | 487.289 | 3.00 | 1.516330 | 64.1 | 63.00 | |
| 2 | 53.083 | 13.56 | | | 55.67 | |
| 3* | 180.128 | 3.00 | 1.772499 | 49.6 | 43.78 | |
| 4 | 28.487 | 15.67 | | | 36.17 | |
| 5 | −35.121 | 1.80 | 1.496999 | 81.5 | 34.63 | |
| 6 | 94.929 | 5.75 | | | 35.97 | |
| 7 | 176.927 | 1.90 | 1.922860 | 18.9 | 38.28 | 0.6495 |
| 8 | 86.983 | 8.60 | 1.720467 | 34.7 | 38.72 | 0.5834 |
| 9 | −49.721 | (Variable) | | | 39.28 | |
| 10 | 86.153 | 3.30 | 1.548141 | 45.8 | 34.40 | |
| 11 | 681.902 | (Variable) | | | 34.18 | |
| 12 | 78.901 | 4.10 | 1.698947 | 30.1 | 33.00 | |
| 13 | −325.809 | 23.95 | | | 32.63 | |
| 14 | −169.695 | 4.70 | 1.516330 | 64.1 | 23.10 | |
| 15 | −22.591 | 4.90 | 1.882997 | 40.8 | 22.93 | |
| 16 | −33.429 | (Variable) | | | 23.84 | |
| 17 (Stop) | ∞ | 0.60 | | | 19.30 | |
| 18 | −77.986 | 1.10 | 1.850259 | 32.3 | 19.30 | |
| 19 | 23.542 | 5.90 | 1.516330 | 64.1 | 19.69 | |
| 20 | −40.720 | (Variable) | | | 20.69 | |
| 21 | −21.824 | 1.30 | 1.850259 | 32.3 | 21.91 | |
| 22 | 100.083 | 6.90 | 1.516330 | 64.1 | 25.82 | |
| 23 | −27.766 | 1.71 | | | 28.26 | |
| 24 | 226.799 | 10.50 | 1.438750 | 94.9 | 35.13 | |
| 25 | −28.980 | (Variable) | | | 37.13 | |
| 26 | 77.314 | 5.30 | 1.808095 | 22.8 | 39.86 | |
| 27 | −302.740 | 2.75 | | | 39.60 | |
| 28 | ∞ | 30.02 | 1.516330 | 64.1 | 40.00 | |
| 29 | ∞ | 7.82 | 1.516330 | 64.1 | 40.00 | |
| 30 | ∞ | 19.50 | 1.805182 | 25.4 | 40.00 | |
| 31 | ∞ | | | | 40.00 | |
| Image plane | ∞ | | | | | |

Aspheric surface data

First surface

| | | |
|---|---|---|
| K = 0 | A4 = 7.46642e−006 | A6 = −5.68504e−009 |
| A8 = 6.27502e−012 | A10 = −4.07337e−015 | A12 = 1.54366e−018 |

Third surface

| | | |
|---|---|---|
| K = 0 | A4 = −5.42242e−006 | A6 = 5.41037e−009 |
| A8 = −1.21441e−012 | A10 = −6.57542e−015 | A12 = 6.97510e−018 |

-continued

Various data
Zoom ratio 1.50

|  | Wide-angle | Middle | Telephoto |
|---|---|---|---|
| Focal length | 15.71 | 19.44 | 23.59 |
| F number | 2.09 | 2.22 | 2.34 |
| Half angle of view (degree) | 39.7 | 33.9 | 29.0 |
| Image height | 13.1 | 13.1 | 13.1 |
| Total lens length | 247.15 | 247.15 | 247.15 |
| BF | 45.78 | 45.78 | 45.78 |
| d9 | 41.15 | 20.33 | 5.00 |
| d11 | 2.01 | 8.23 | 9.10 |
| d16 | 1.50 | 5.01 | 9.14 |
| d20 | 4.62 | 4.70 | 3.48 |
| d25 | 1.00 | 12.00 | 23.56 |

Zoom lens unit data

| Unit | Start surface | Focal length |
|---|---|---|
| 1 | 1 | −39.97 |
| 2 | 10 | 179.55 |
| 3 | 12 | 62.66 |
| 4 | 17 | −89.49 |
| 5 | 21 | 275.98 |
| 6 | 26 | 76.69 |

TABLE 1

| Condition | | Exemplary embodiment | | | |
|---|---|---|---|---|---|
| | | 1 | 2 | 3 | 4 |
| (1) $f_N/f_W$ | | −8.59 | −10.27 | −3.59 | −11.9 |
| (2) $\Delta\theta_N - \Delta\theta_P$ | | 0.041 | 0.041 | 0.042 | 0.041 |
| (3) $(\nu_P \cdot f_P)/(\nu_N \cdot f_N)$ | | −0.54 | −0.57 | −2.22 | −0.44 |
| (4) $\theta_N/\theta_P$ | | 1.11 | 1.11 | 1.13 | 1.11 |
| (5) $n_P < n_N$ | $n_N$ | 1.92286 | 1.92286 | 1.92286 | 1.92286 |
| | $n_P$ | 1.72047 | 1.72047 | 1.65412 | 1.72047 |
| (6) $n_N - n_P$ | | 0.20239 | 0.20239 | 0.26874 | 0.20239 |
| (7) $2\omega$ | | 79.8° | 79.6° | 90.4° | 79.4° |

With the exemplary embodiments, it is possible to obtain an optical system having less lateral chromatic aberration and distortion, easily providing a long back focus, having favorable telecentricity on a projected side, and having a wide angle of view.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-001013 filed Jan. 8, 2013, which is hereby incorporated by reference herein in its entirety.

What is claimed is:

1. An optical system comprising, in order from an enlargement side to a reduction side:
a front lens unit having negative refractive power;
a stop; and
a rear lens unit having positive refractive power,
wherein the front lens unit includes a combination lens in which a negative lens and a positive lens are adjacently arranged in order from the enlargement side to the reduction side, and
wherein, when a focal length of the negative lens is $f_N$, an Abbe number and relative partial dispersion of a material of the negative lens are $\nu_N$ and $\theta_N$, respectively, an Abbe number and relative partial dispersion of a material of the positive lens are $\nu_P$ and $\theta_P$, respectively, and a focal length of the entire optical system is $f_W$, following conditions are satisfied:

$$-20 < f_N/f_W < 2$$

$$0.01 < [\theta_N - (-0.01618\nu_N + 0.6415)] - [\theta_P - (-0.01618\nu_P + 0.6415)] < 0.20.$$

2. The optical system according to claim 1, wherein the optical system is a zoom lens,
wherein the front lens unit includes a plurality of lens sub-units,
wherein the rear lens unit includes a plurality of lens sub-units,
wherein distances between the lens sub-units change during zooming, and
wherein the focal length of the entire optical system $f_W$ is a focal length of the entire optical system at a wide-angle end.

3. The optical system according to claim 1, wherein the optical system is a zoom lens,
wherein the front lens unit includes, in order from the enlargement side to the reduction side, a first lens sub-unit having negative refractive power, a second lens sub-unit having positive refractive power, a third lens sub-unit having positive refractive power, and a fourth lens sub-unit having positive refractive power,
wherein the rear lens unit includes, in order from the enlargement side to the reduction side, a fifth lens sub-unit having negative refractive power, a sixth lens sub-unit having positive refractive power, and a seventh lens sub-unit having positive refractive power,
wherein the first lens sub-unit and the seventh lens sub-unit do not move for zooming,
wherein the second lens sub-unit to the sixth lens sub-unit move during zooming, and
wherein the focal length of the entire optical system $f_W$ is a focal length of the entire optical system at a wide-angle end.

4. The optical system according to claim 1, wherein, when a focal length of the positive lens is $f_P$, following condition is satisfied:

$$-4.0 < (\nu_P \cdot f_P)/(\nu_N \cdot f_N) < -0.2.$$

5. The optical system according to claim 1, wherein following condition is satisfied:

$$1.0 < \theta_N/\theta_P < 1.3.$$

6. The optical system according to claim 1, wherein, when a refractive index of a material of the negative lens is $n_N$, and a refractive index of a material of the positive lens is $n_P$, following condition is satisfied:

$$n_P < n_N.$$

7. The optical system according to claim 1, wherein the negative lens and the positive lens are cemented.

8. The optical system according to claim 1, wherein an air lens formed by the negative lens and the positive lens has positive refractive power.

9. The optical system according to claim 1, wherein, when a refractive index of a material of the negative lens is $n_N$, and a refractive index of a material of the positive lens is $n_P$, following condition is satisfied:

$$0.1 < n_N - n_P.$$

10. The optical system according to claim 1, wherein the combination lens is a combination lens located closest to the enlargement side out of combination lenses each including a negative lens and a positive lens in order from the enlargement side to the reduction side.

11. An image projection apparatus comprising:
a light modulation element configured to modulate incident light; and
the optical system according to claim 1 configured to project light modulated by the light modulation element.

12. The image projection apparatus according to claim 11, wherein, when a projection angle of view of the optical system is $2\omega$ (degree), or a projection angle of view at a wide-angle end when the optical system is a zoom lens is $2\omega$, following condition is satisfied:

$60° < 2\omega$.

* * * * *